United States Patent [19]
Carlsen, II

[11] Patent Number: 5,526,075
[45] Date of Patent: Jun. 11, 1996

[54] APPARATUS FOR READING ANALOG SOUND TRACKS ON FILM WITH CIRCUIT FOR AVERAGING SOUND TRACK BOUNDARIES TO REDUCE THE EFFECT OF NOISE

[75] Inventor: George D. Carlsen, II, Cardiff, Calif.

[73] Assignee: Digital Technology Systems of California, Inc., Solana Beach, Calif.

[21] Appl. No.: 192,365

[22] Filed: Feb. 7, 1994

Related U.S. Application Data

[63] Continuation-in-part of Ser. No. 119,646, Sep. 13, 1993, abandoned, and a continuation-in-part of Ser. No. 154,878, Nov. 19, 1993, abandoned.

[51] Int. Cl.⁶ .............................. G03B 31/02; G11B 7/00
[52] U.S. Cl. .............................. 352/26; 352/37; 369/125
[58] Field of Search .............................. 352/1, 5, 11, 26, 352/27, 29, 37; 369/124, 125; 371/36, 37.9, 64

[56] References Cited

U.S. PATENT DOCUMENTS

| | | | |
|---|---|---|---|
| 3,915,566 | 10/1975 | Fisher | 352/10 |
| 3,964,826 | 6/1976 | Joseph et al. | 352/10 |
| 3,973,839 | 8/1976 | Stumpf et al. | 352/5 |
| 4,027,958 | 6/1977 | Shigeta et al. | 353/26 A |
| 4,085,296 | 4/1978 | Keegan | 369/112 |
| 4,124,784 | 11/1978 | Johnson et al. | 369/89 |
| 4,181,433 | 1/1980 | Marcuse | 356/73.1 |
| 4,215,920 | 8/1980 | Butler | 352/92 |
| 4,355,383 | 10/1982 | Dolby | 369/120 |
| 4,491,399 | 1/1985 | Bell | 352/92 |
| 4,577,302 | 3/1986 | Allen | 369/46 |
| 4,600,280 | 7/1986 | Clark | 352/37 |
| 4,603,099 | 7/1986 | Drexler | 430/140 |
| 4,691,112 | 9/1987 | Wydler | 250/570 |
| 4,758,485 | 7/1988 | Drexler | 430/12 |
| 4,827,125 | 5/1989 | Goldstein | 250/234 |
| 4,962,432 | 10/1990 | Ohtsuka et al. | 358/302 |
| 5,101,096 | 3/1992 | Ohyama et al. | 235/436 |
| 5,152,295 | 10/1992 | Kobayashi et al. | 128/665 |
| 5,164,574 | 11/1992 | Ujiie et al. | 235/462 |
| 5,212,583 | 5/1993 | Vali et al. | 359/245 |
| 5,231,627 | 7/1993 | Paul et al. | 369/125 |

*Primary Examiner*—Michael L. Gellner
*Assistant Examiner*—Eddie C. Lee
*Attorney, Agent, or Firm*—John L. Rogitz

[57] ABSTRACT

An analog-digitizer sound system for motion pictures that automatically converts both old and new analog stereo film-sound tracks to digital quality sound. The system eliminates the noise, rumble and hiss from any standard 35 mm analog optical sound track. By simply playing the film through the projector sound head in the normal manner the system automatically converts the analog optical sound tracks to digital format. No special storing of digital data on film is required and no special digital decoder equipment is needed. The system produces noise-free sound, increased frequency response, expanded dynamic range and clarity of dialogue. Film studios will no longer need to maintain a double inventory of digital and analog sound or process sound tracks for noise reduction.

1 Claim, 6 Drawing Sheets

FIGURE 12 ns of the tracks
APPARATUS FOR READING ANALOG SOUND TRACKS ON FILM WITH CIRCUIT FOR AVERAGING SOUND TRACK BOUNDARIES TO REDUCE THE EFFECT OF NOISE This application is a continuation-in-part of U.S. Pat. applications Ser. Nos. 08/119,646, filed Sep. 13, 1993, now abandoned, and 08/154,878 filed Nov. 19, 1993, now abandoned both of which applications were filed in the name of the present Applicant. This application claims priority from each of the above-referenced applications and incorporates by reference each of the above-referenced applications.

BACKGROUND OF THE INVENTION

The invention relates to motion pictures and more specifically to an analog-digitizer sound system for motion pictures.

The present standard for sound-tracks imaged on motion picture film dates back to 1967 wherein the location on, and the area covered by stereo sound tracks on film was specified. This standard describes the dimensions of the tracks and the related standards used today. This method places two tracks along one edge of the film which are of two types, variable density and variable area, the last of which is used almost exclusively. Inherent to this method of reproducing sound is the undesirable effect of background noise and rumble due to the nature of the plastic medium and residue of the film emulsion passing through the light beam of the photo sound detector. Dolby Corporation with its Dolby B,C,H, etc has pretty much dominated the industry both with its noise reduction systems for movie film and those for magnetic tape. However even with the best system Dolby can offer, the sound suffers distortions and amplitude variations caused by the extreme processing needed to remove random noise from between the normal sound peaks.

The introduction of the compact disk or CD with its almost perfect sound reproduction ability has stimulated interest by several companies to try and incorporate digital-quality sound on film.

This has proven to be a formidable problem because of the immense amount of digital information required to produce the multiple channel digital formats while keeping the old stereo sound tracks intact for general use by most movie theaters. Also the cost of the digital reader-heads to decode the new digital sound tracks is very high. Dolby Laboratories has quite recently developed its Theater Digital System that is currently being tested in a number of theaters. Sony Corporation is expected to introduce their digital system in the near future. It should be noted that these systems are expensive and complicated. Also the economics of necessary maintenance and the actual working-life of a digitally-encoded film sound-track has yet to be established.

None of the new digital sound systems that are being developed by these major corporations at great expense, does anything to improve the old analog film sound-track that must remain on the film.

The background of the present invention relates to the reproduction of sound from motion picture film. Two of the biggest hurdles to overcome in the effort to improve sound from movie film are the increase of high frequency response and the reduction of background noise. Filters to reduce background noise also reduce high frequency response which forces the user to use compression and dynamic filter techniques. These lead to unwanted distortions and complexity.

Present analog sound track readers used in moving picture theater projectors read the variable width sound tracks on motion picture film by back lighting the sound track portion of the film with a focused slit of light which is arranged perpendicular to the direction of travel of the film and just wide enough to span both tracks of the normal stereo print. A dual photo detector is placed on the opposite sides of the film to intercept the light which passes through the sound track portion of the film. The two tracks, which are transparent to light, vary in width as the film moves past the slit light source. The thickness of the slit light source and the instantaneous width of the sound track as it passes the photo detector determines the total amount of light falling on the photo detector and in turn the amount of electrical output from the detector. As the film continues to move past the detector the sound information which modulates the width of the tracks is converted to an electrical audio output signal. Present photodiode detectors are linear devices and any change in the amount of light falling on the detector causes a corresponding electrical output. Electrical output changes due to different changes in the width of the sound tracks cause useful output. However changes due to residual emulsion, scratches, dirt and light aberration through the film plastic medium cause unwanted light modulation and are perceived as background noises in the electrical output.

The frequency response of present systems, irrespective of the noise limitation, is ultimately limited by the recording camera response. In reality, the limitation is based on the thickness of the slit light source used during playback. The best of the slit lenses produce about a 0.5 mil slit thickness which produces a high frequency limit of about 18 KHZ. These wide band slit lenses are usually used in special playback systems such as Dolby stereo or Surround Sound and are followed by dynamic noise filters and expanders. These require that the film be specially recorded with compression techniques to improve signal to noise ratios. Generally slit sizes are used which produce high frequency limits of about 9 to 16 KHZ.

The prior art patents of Johnson and Paul show how major improvement in frequency response is achieved by scanning dark to light boundaries in the sound track area rather than detecting the total amount of light passing through it. They also show how the inherent analog noises which are caused by light aberration in the film medium film emulsion residue and irregular light transmission through the film are ignored. The scanning method used by Johnson #4,124,784 detects the first dark to light boundary of the sound track area and generates a pulse which has one edge that varies in time with respect to the first dark to light boundary of the sound track and a fixed edge which is established by the end of the CCD scanning device. This width modulated pulse is filtered and converted to an audio signal by a pulse width to voltage converter.

Paul U.S. Pat. No. 5,231,627 also uses a linear CCD array to detect both boundary transitions of each variable width sound track on film and processes the CCD data to produce a stream of width modulated pulses which are ultimately separated into separate channels and converted into two channels of audio.

The indicated methods and devices used by Johnson and Paul greatly increase the frequency response and effectively reduce the hiss and rumble caused by the film medium in variable width sound track play back systems. However, other types of noise exist in variable width sound track sound systems. The worst of which is noise due to scratches, blotches and missing areas of dark emulsion. The reproduction of this type of track noise manifests itself as pops, cracks and thumps. Compared to the low level rumble and hiss noise generated in the film medium which is a baseline noise. The pops, cracks and thumps are very noticeable and can be as large as full transition where audio output signals if not limited will go to full to peak amplitude. The elimination of pop-crack-thump noise has not been addressed by the above patented systems except in the Johnson system wherein the first dark-light boundary in the variable width sound track is detected and begins a timing cycle which ends when the CCD scanner reaches end of scan. During this time the output of the CCD scanner is ignored until end of scan thereby eliminating all noise after the detection on the first boundary transition. A corresponding pulse is generated which has a width proportional to the time from detection of the first light dark boundary to the end of scan. The result is all blotches and scratches are ignored after the first boundary is detected. This first method is good except for scratches and blotches which fall on the first boundary area.

SUMMARY OF THE INVENTION

The novel analog-digitizer sound system for motion pictures has been designed to be retro-fit to existing sound head housings but the system can also be incorporated in newly manufactured sound head housings.

The present invention includes structure for linearly scanning a light beam of appropriate dimensions and intensity perpendicularly across the movie film sound tracks. A photo detector is placed on the opposite side of the film to intercept the light beam such that when the light beam is directed on the dark or emulsion portion of the film there is no output from the photo detector. When the light beam is directed on the transparent portion of the film the photo detector is saturated. The resulting output of the photo detector is a group of electrical pulses each having a width proportional to the width of the related transparent portion of the film sound tracks and all having a fixed amplitude. Continuously scanning the light beam at a fixed rate and frequency across the film sound tracks produces a continuous stream of pulses each changing in width at a rate related to the instantaneous changes in the widths of the transparent portions of the sound tracks. The scanning frequency of the beam is chosen to produce the desired high frequency response of the system, usually twice the desired frequency.

The resulting width modulated pulse streams are passed through integrators which convert the pulse streams to audio signals. The benefits of this method are first that since the detected pulses are either zero amplitude at dark emulsion or saturated at transparent, all noise due to residual emulsion or aberration in the film medium are eliminated and other defects such as scratches and dirt have to exceed an adjustable noise threshold before they are detected. Second, the high frequency response is set by the scan rate and beam size and not limited by the characteristics of a light slit and a photo linear photo detector.

Different methods of scanning are possible:
1. Scanning beam of light and a fixed photo detector
   a. Cathode ray tube and a photo detector.
   b. Mirrored galvanometer and a photo detector.
   c. Scanning LED array and a photo detector.
2. Fixed slit of light and a scanning photo detector
   a. Fixed slit of light and a Videcon camera tube.
   b. Fixed slit of light and a charge coupled device.

The above methods are possible alternatives but the preferred method is (b) of group 2. It consists of a light source, not a slit, and a CCD linear scanner. In this configuration a spot of light just slightly larger than the width of the sound track is directed toward the sound track on one side of the film and the reverse side of the illuminated area is focused with a lens on the active area of the CCD linear scanner. The effective slit width of the scanner is reduced by the magnification value of the lens. For example, the CCD scanner has an aperture of 13 um and the lens has a magnification value of 2.25 which effectively reduces the slit to a 7.1 um giving a maximum frequency response of 39.6 KHZ, more than double the present value. The scan frequency of the CCD device is set by the electronics used to drive it and is chosen to produce the desired output band width.

In the preferred embodiment, the system includes a small quartz halogen lamp as its light source. This light source illuminates one end of a fiber optic cable and the other end of the fiber optic cable is coupled by a sleeve to a light conduit in the form of a clear plastic rod, which is bent and shaped so that its open end is aligned perpendicular with the sound track portion of the film. The light conduit is used to direct the light to the desired area of the film and serves a second purpose to produce a more uniform light spot. The lens on the other side of the film picks up the back lighted image of the sound track and magnifies it 2.25 times then projects the resulting larger image of the sound track onto the image sensor in the scanning photo detector (CCD). The scanning photo detector effectively scans across the track image and converts the image of the sound track or track into one or two pulses depending on whether the film is mono or stereo. As the film moves past the photo sensor the sound tracks vary in width and the output pulses from the scanning photo detector vary in width accordingly. The scanning photo detector electronically scans the magnified image 40,000 times per second which sets the rate of the output pulse or pulses. The scanning photo sensor consists of an integrated row of photo sensors in a silicon chip numbering 512 which are sequentially read by the on chip scan circuitry. As each of the 512 photo sensors is read an output voltage is produced from each which is proportional to the amount of light falling on it and when all are combined a video signal is produced which is a profile of the light intensity across the scanned image. The effective width of the scan line made by the photo sensor array is 6 um or 0.00024 inches. This line thickness determines the resolution or frequency response of the system. The very best present systems have a maximum frequency response of 18 KHZ, and the novel system has a frequency response of 38.1 KHZ which is more than double the old.

The scanning photo detector output is connected through an interconnect cable to a pulse width modulation (PWM) electronics box where the pulse stream is converted into one or two channels of audio. It is then transmitted to pre amps and amplifiers of the existing theater sound system. The sound thus produced is noise-free, has an increased frequency response, has an expanded dynamic range and produces an increased clarity of dialogue.

Normally there are only two sound tracks on 35 mm movie film for stereo sound. Some older films have only one track. The number of pulses from the scanner for each scan is equal to the number of sound tracks on the particular film being used. For stereo sound two pulses are generated. Each of the two pulses from the scanner which are varying in width relative to the sound tracks are steered to a separate circuit where it is integrated with respect to time and converted to an electrical audio signal.

The pulses from the scanner have only two discrete levels zero and maximum. The two levels represent no light or full light levels on the scanner active area. This provides a noise threshold wherein the noise sources on the film must have a contrast equal to the sound track area contrast or be ignored by the scanner. By its nature this eliminates emulsion residue and plastic film medium aberration effects on the output signal. Other sources of noise which cause unwanted pulse width modulation are required to exceed another threshold set by the integrating circuitry before conversion to audio. A potentiometer in the circuitry of the PWM electronics box can be adjusted to vary the threshold level from 0 to 100 percent. By using 20 percent of the amplitude, any noise has to be 80 percent of the total amplitude before it will be sensed at all.

The present invention takes the elimination of pop-crack-thump noises another step further by use of both boundaries in the following way. The great majority of scratches on movie film are oriented in the direction of film travel and are generally narrow with respect to the variable width of the sound track. These scratches pass through only one of the boundary areas not both. Most blotches and missing emulsion are less than a half track width at most because of the high quality control requirements in film processing. Since both light dark boundaries of a given sound track have the same but inverted positional information with respect to the start of scan, each can be sampled and combined with the other to reduce noises not common to both. Further noise reduction can be achieved by storing two samples from one scan and holding them in sample and hold circuit circuits while a second set of samples are taken in the next scan and stored similarly. The resulting four stored samples which have the same audio information but different noise content are combined in such a way that the noncommon noise from each is reduced by a factor of four in the final output signal. This sequence is repeated continuously with the last samples held combined with each new set of samples.

DESCRIPTION OF THE PREFERRED EMBODIMENT

Figure 1:
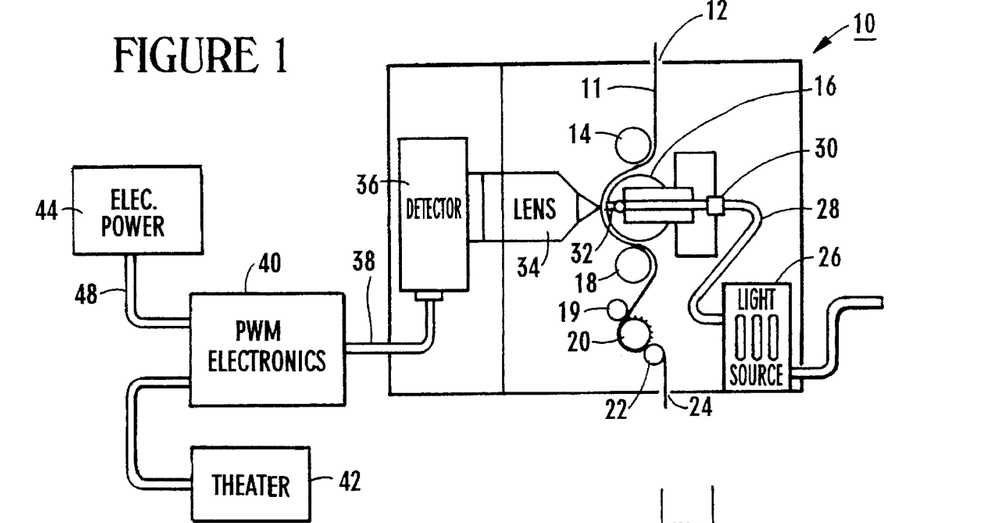
FIG. 1 is a schematic illustration of the novel sound system that is incorporated into the sound head housing.

The novel analog-digitizer sound system will now be described by referring to FIGS. 1–4 of the drawing. The basic components of the system are mounted in the sound head housing of a motion picture projector system. Normally the sound head system is located immediately below the projector head. In FIG. 1 the sound head housing is generally designated numeral 10. Motion picture film 11 enters through an entrance opening 12 and passes around a guide roller 14. Next it passes around capstan fly wheel 16, guide rollers 18 and 19 and then around drive sprocket 20. Then it passes around guide roller 22 and it exits through an opening 24 and is wound on take-up reels (not shown).

A light source 26 illuminates one end of a fiber optic cable 28. The other end of the fiber optic cable is coupled by sleeve 30 to a light conduit 32 which is bent to shape so that its open end aligns with the sound track portion of the film. Lens 34 picks up the back lighted image of the sound track and magnifies it 2.25 times and then projects the resulting larger image of the sound track onto the image sensor in the scanning photo detector 36. Scanning photo detector 36 could take the form of any of the following: (a) Videcon camera tube scanner, (b) a galvanometer scanner with photo detector, (c) a rotating mirror with photo detector, (d) an oscillating mirror with photo detector, (e) a charge coupled scanning detector (CCD). The scanning photo detector 36 output is connected through interconnect cable 38 to the PWM electronics box 40 where the pulse stream is converted into one or two channels of audio for output to the preamps, amplifiers, and speakers in theater 42. Power 44 is supplied to the PWM box 40 through cable 46 and carried back through cable 38 to power the scanning detector 36.

Figures 2, 3, 4, 5:
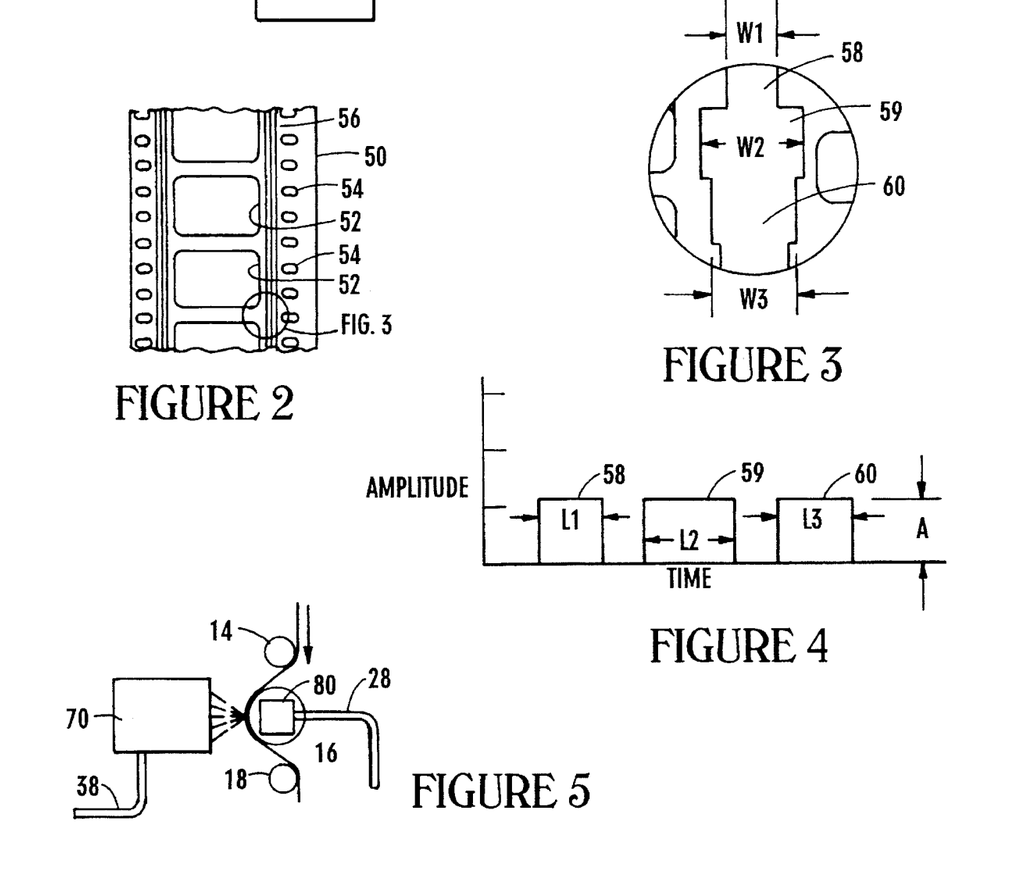
FIG. 2 illustrates a portion of a film strip showing an analog sound track thereon.
FIG. 3 is an enlarged schematic illustration of the sound track seen in FIG. 2.
FIG. 4 is a schematic illustration of the square wave produced by the instantaneous width of the analog sound track in FIG. 3.
FIG. 5 is a schematic illustration showing an alternative embodiment that utilizes a stationary photo detector 70 and a scanning light source 80. The remaining structure of the analog-digitizer sound system is the same as that illustrated in FIG. 1 and functions in the same manner. Scanning light source 80 may take several forms such as cathode ray tube scanner, a light beam and galvanometer scanner, a light beam and oscillating mirror scanner, or a light emitting diode array scanner.

FIG. 5 shows an alternative embodiment for scanning a motion picture sound track in which a stationary photo detector 70 and a scanning light source 80 are employed. The scanning light source 80 may take any of the several forms described above. However, the effect of this embodiment is the same as any of the alternatives in that as the beam projected by scanning light source 70 traverses the sound track, the output of the stationary photo detector 80 will rise when the illumination from the light source 70 is first detected, remain at a predetermined level for as long as the beam traverses the transparent sound track and then fall as the beam leaves the sound track. Those skilled in the art will appreciate that the photo detector 80 can be appropriately operated to provide no output in synchronism with a return scan of the light source 70.

A portion of a strip of film 50 is illustrated in FIG. 2 having picture frames 52, sprocket apertures 54 and a stereo sound track 56. In FIG. 3 a portion of the stereo sound track is magnified to illustrate the analog sound track on the film strip and its clear strip having various width portions 58, 59 and 60. In FIG. 4, widths 58, 59 and 60 have been transformed into block signals each having a constant amplitude A but variable widths L1, L2 and L3.

Figure 6:
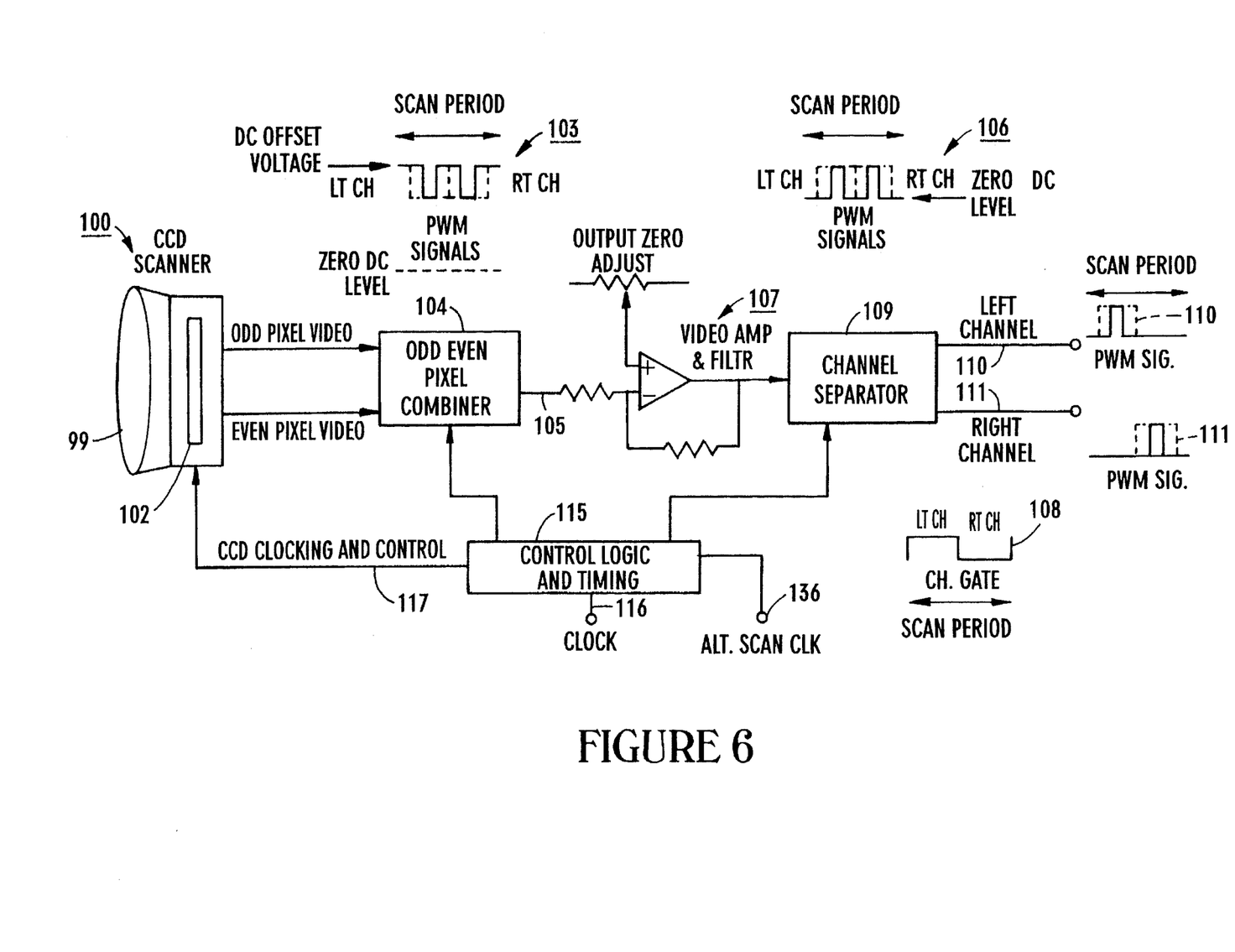
FIG. 6 is a scanner head block diagram showing one method of scanning the sound track area of movie film to produce a series of width modulated pulses related to the instantaneous width of the variable width sound tracks thereon.

The widths L1, L2 and L3 correspond, respectively to sound track width portions 58, 59, and 60. The widths are produced according to the invention by a preferred scanning photo detector illustrated in the schematic block diagram of FIG. 6. In FIG. 6, a CCD detector unit 100 includes a 1×N array of CCD cells 102. A lens 99 focuses an enlarged transverse image of the portion of a motion picture film containing one or more analog sound tracks on the array 102. The lens and the array of cells 102 are arranged to be substantially transverse to the longitudinal axis of the film strip 50 and, therefore, to the longitudinally extending sound tracks. Preferably, the array 102 is essentially perpendicular to the longitudinal axis of the film strip.

The CCD detector unit 100 is conventional and includes a pair of parallel-to-serial registers, one for receiving and clocking out the instantaneous magnitudes of the charges accumulated in the odd cells of the array 102, and the other for receiving and clocking out the change magnitudes in the evenly spaced cells. These are referred to hereinafter as "odd pixel video signals" and "even pixel video signals". Odd and even pixel signal streams are fed to an odd/even pixel combiner 104 which includes a high-speed analog switch that operates conventionally to interleave the odd and even pixel video signals to produce a single pixel video signal stream at its output 105. The output of the odd/even pixel combiner 104 is fed to a video amplifier and filter 107 which operates conventionally as an envelope detector and amplifier. A channel separator 109 including a conventional analog switch separates width-modulated pulses into right and left channel signals provided, respectively, on outputs 110 and 111. Control logic 115 receives a 20 MHz digital clock signal at 116 and outputs CCD clocking and control signals on signal line 117 which are fed to the CCD detector unit 100 for framing and for clocking odd and even pixel video signals in the CCD unit 100 in a conventional manner. Preferably, the array 102 is a 1×512 array of CCD cells and the 20 MHz signal input at 116 is divided by 2 to 10 provide a 10 MHz pixel clocking signal and by 256 to provide a frame rate of 40 KHz. The combiner 104 comprises an analog switch having two inputs and a single output. The combiner 104 is clocked at 10 MHz, at which rate its output alternates between the odd and even pixel video signals at its inputs. In this manner, the odd and even pixel streams are interleaved into a single stream of pixel signals.

The video amplifier 107 is conventionally configured to generate a signal representing the envelope of the stream of pixels at one input. The other input is connected to a zero level adjust voltage. The output of the video amplifier 107 is deinterleaved by the channel separator 109 which alternately connects its outputs 110 and 111 to its input at a 40 KHz frame rate.

In operation, the 40 KHz frame rate signal provided to the CCD detector unit 100 captures an image of the width of one or more analog sound tracks on a film strip moving longitudinally through a sound head housing. During one state of the frame rate signal, the contents of the registers CCD detector unit 100 are read out in sequence to the combiner 104 at the 10 MHz rate while the cells in the array 102 are receiving the next image of the width of the sound track. In the second state of the frame rate signal, the charges are maintained in the array 102 and entered into the registers. In practice of the invention, the cells in the array 102 are electronically configured to operate in a saturated state, being turned fully on or fully off according to whether they are illuminated or not. This mode of operation inherently eliminates the effects of noise caused by unintended variations in the transparent portion of an analog sound track caused by, for example, scratches, dust, and residual emulsion. Relatedly, the 40 KHz frame rate establishes the rate at which the width of the analog sound track is sampled, implying an information band width of 20 KHz. Essentially, the array 102 captures an image or snapshot of the instantaneous width of the analog sound track 40,000 times per second.

As shown in FIG. 6, the combiner 104 provides at its output 105 successive sequences of pixel signals of essentially equal amplitude. The number of pixel signals in a sequence directly corresponds to the instantaneous width of the analog sound track. If the analog sound track is stereophonic, two sequences, one per channel, are provided by the combiner 104 for each frame.

The envelope of a sequence of pixel signals that is generated by the video amplifier 107 defines a pulse having a width essentially equal to the width of the sequence of pixel signals. Again, for a stereophonic sound track, the video amplifier 107 will provide two width-modulated pulses during each frame.

Manifestly, the pulses produced by the video amplifier 107 contain, in their widths, a measure of the instantaneous width of a motion picture film sound track. Those skilled in the art will appreciate that the pulse modulation unit 40 of FIG. 1 may employ other means to carry the instantaneous width information. For example, the width of a sound track can be represented during a frame by the distance between two pulses in a pulse-position modulated system, or by the frequency or phase of a stream of pulses in a pulse modulating system. Most generally, the width of a pixel signal sequence may be used to modulate the characteristics of virtually any signal chosen as an intermediary between the scanning and audio portions of the invention, including, but not limited to characteristics of phase, frequency, and color.

Returning to the explanation of the operation of the scanning photo detector illustrated in FIG. 6 the channel separator operates at the frame rate to separate width-modulated pulses into right and left channel pulse streams. These streams are fed to the pulse width decoding circuit illustrated in FIG. 7.

Figure 7:
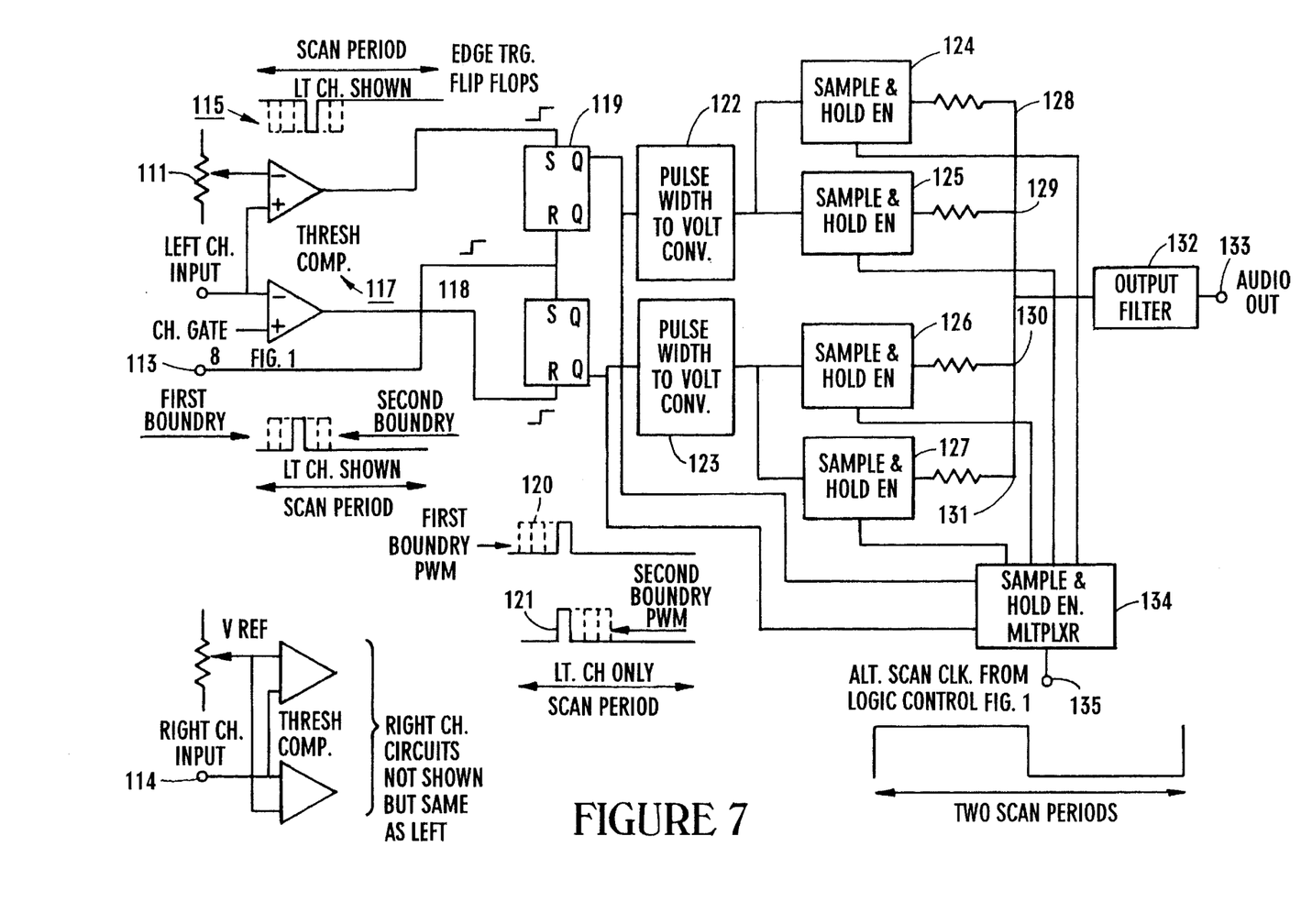
FIG. 7 illustrates the PWM and noise reduction circuit block diagram showing a method of separating the first and second boundary transitions of the width modulated pulses from the scanner in order to produce two separate pulse width modulated signals from the same channel and also the multi sample noise reduction circuit and output filter.

In FIG. 7, the width of modulated pulse stream 109 from the scanner head is connected to the input 112 of threshold comparators 117. The input pulse stream is converted into two complementary width modulated pulses 115 & 116. The comparator 117 outputs are connected to the set and reset inputs of edge triggered flip flops 122 and 123. Channel gate signal 113 from the scanner control logic circuit 104 is tied to the alternate set-reset input of flip flops 122 and 123. The resulting outputs 120 and 121 from flip flops 122 and 123 are two pulse width modulated signals, one 120 contains the first boundary information and the other 121 contains the second boundary information. The first boundary pulse 120 is connected to a pulse width to voltage converter 122 where it is converted to a voltage level related to its width. The same boundary pulse 120 also functions as an enable for sample and hold circuits 124 and 125. The enables for the sample and hold circuits are produced by logically combining the boundary pulses 120 and 121 with the alternate scan clock 135 in the sample and hold enable multiplexer 134. The voltage level from the width to voltage converter 122 is stored in either sample and hold 124 and 125 depending on the polarity of the alternate scan clock 135. The function of the second boundary pulse 121 is similar to 120 but includes pulse to voltage converter 123 and sample and hold circuits 126 and 127. The four outputs of the sample and holds 124, 125, 126 and 127 are combined in resistor network 128, 129, 130 and 131 and are connected to output filter 132 to produce the audio output signal 133 for the theater amplifier speaker system. Simple noise reduction is achieved by separating the double boundary width modulated pulse from the scanner head either left or right channel and separating it into two single boundary width modulated pulses each having the same audio sample information but different noise content. These two samples are held in sample and hold circuits while a second scan sample is taken. The second sample is processed the same way to produce two additional samples which are put into two more sample and hold circuits. Each of the above four samples has the same audio signal information but different noise content so when combined in the resistor network any noncommon noise is reduced by the number of sources in the network assuming all the resistors are of equal value. The result is an increase in signal to noise of 12 DB.

Figure 8:
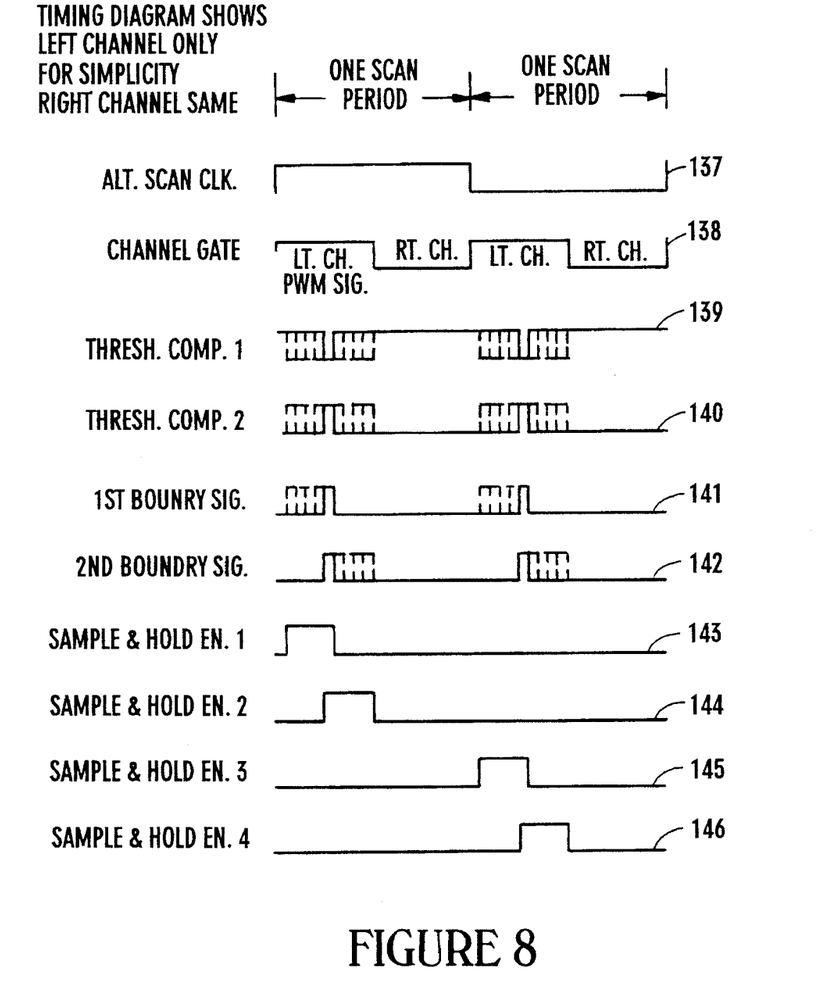
FIG. 8 illustrates a timing diagram for PWM separator circuits and multiple sampling noise reduction circuit.

In FIG. 8 the timing diagram shows the relationships between the scanner output signals, the control logic signals and the noise reduction sequence. The alternate scan clock 137 determines which set of sample and holds will hold the current samples 141 and 142. It steers the enable pulses 120 and 121 to either of two sets of sample and holds 124, 125 or 126 and 127 in FIG. 7. Waveforms 139 and 140 are the double boundary pulse width modulated pulses from threshold comparators 117 FIG. 7 which will each be divided into two single boundary width modulated pulses 141 and 142. Sample and hold enable pulses 143, 144, 145 and 146 are derived from the sample and hold multiplexer which logically combines the alternate scan clock 137 and the single boundary pulses 141 and 142. The foregoing description included only the left channel circuits. The right channel is identical.

Figure 9:
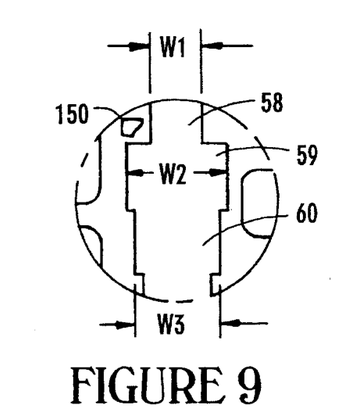
FIG. 9 is an enlarged schematic illustration of a portion of a sound track having a spot of missing emulsion or blotch thereon.
Figure 10:
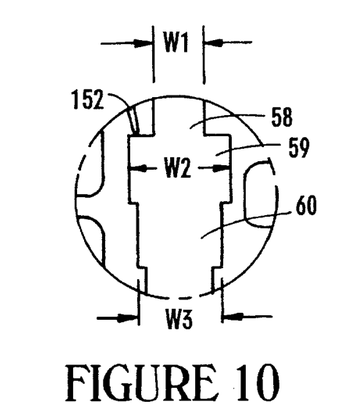
FIG. 10 is an enlarged schematic view of a portion of a sound track having a scratch thereon.

The problem of pop-crack thump noises outside the analog sound track is illustrated in FIG. 9 and 10. In FIG. 9 an example of a spot of missing emulsion or blotch 150 is illustrated and FIG. 10 illustrates a scratch 152.

Figure 11:
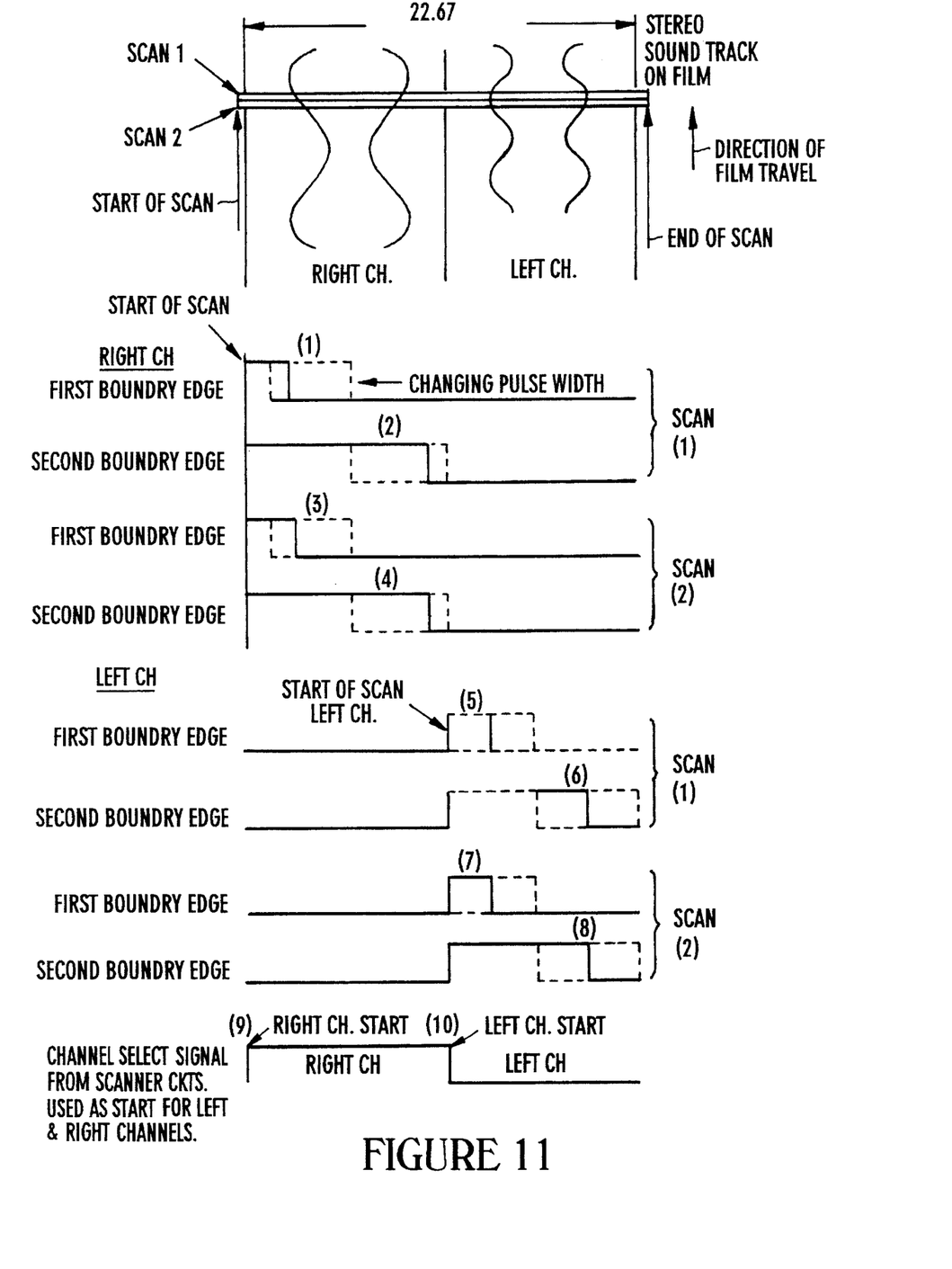
FIG. 11 is a schematic illustration of the manner in which the first and second boundary edge pulse are formed.

An illustration of the manner in which the first and second boundary edge pulses are created is shown in FIG. 11. It shows an enlarged view of a stereo movie film sound track. Two bars traced transverse across the two tracks represent two passes of the scanning device. Start of the scan is at the left of the tracks. The signal which is used to start the scan is generated by the scanner circuitry and is shown at the bottom of the page. The first rising edge (9) of this signal produces the start of the right channel first boundary pulse (1) and the same for the right channel second boundary pulse (2) the pulses end when the boundary is detected. The falling edge of this signal (10) produces the start of the left channel first and second boundary pulses (5) and (6) as well as providing separation of left and right channels. Transition (10) actually represents a point half way through the scan but is actually the start of scan for the left channel. Pulses (1) and (2) as well as (5) and (6) represent the pulses produced by the first scan, pulses (3), (4), (7), (8) are produced by the second scan. A pair of pulses produced in this manner vary in width with respect to the boundary edge they represent. They are in turn converted to a voltage level proportional to their width then stored and combined with a subsequent pair of stored levels from the next scan to reduce noise.

Pulse (1) begins at the start of the scan and ends when the boundary transition is reached. Any scratches or open emulsion after the start of the pulse can effect its final width but any scratches or the like after the boundary transition is reached are ignored. This provides an additional reduction of about 50% in the amount of noise when the channel is running at about half maximum level. So if we combine the noise reduction of the sample combining circuit with the reduction of noise after the boundary transition we have even greater than four to one reduction.

Figure 12:
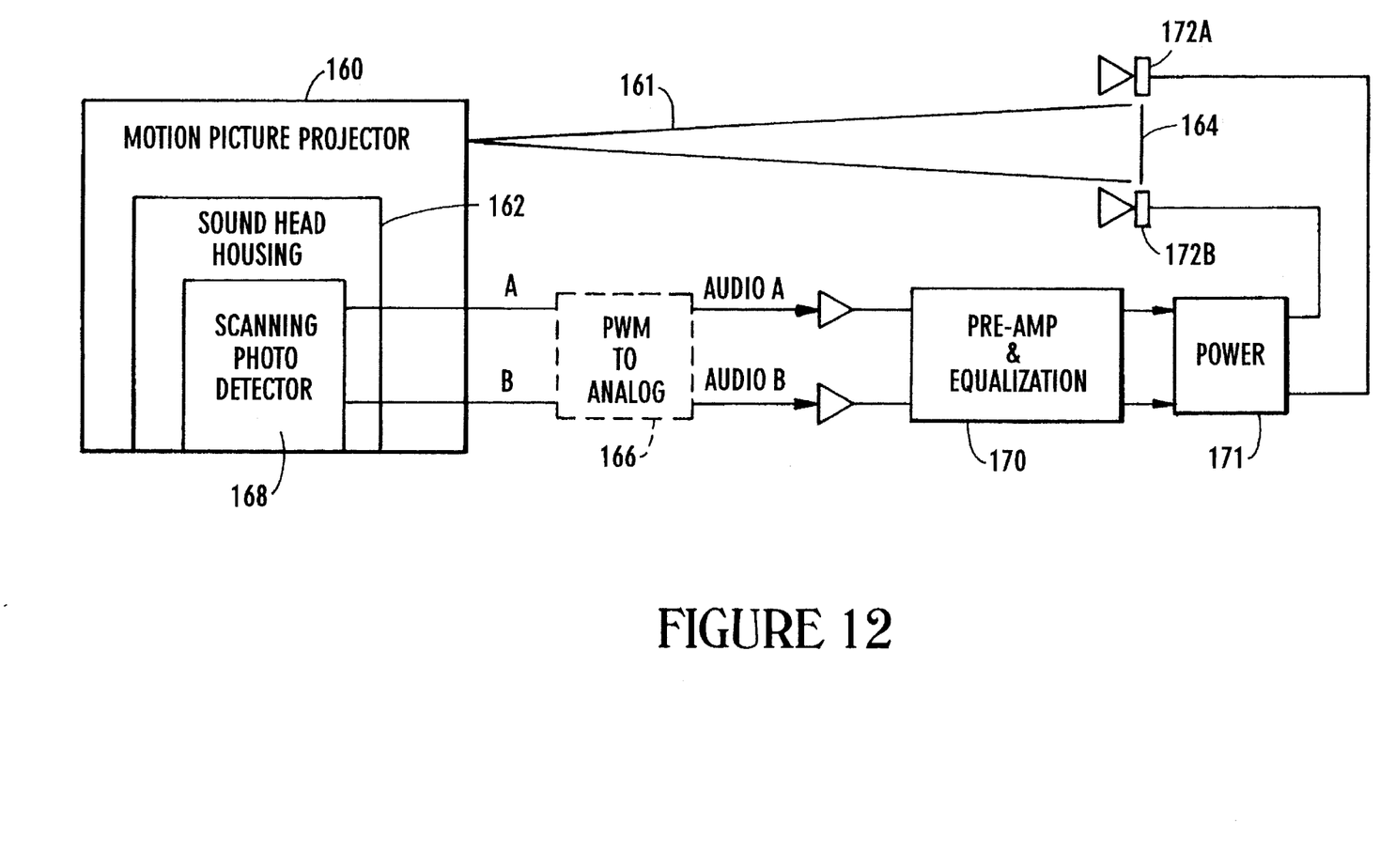
FIG. 12 is a block diagram representing the sound system of a motion picture theater.

FIG. 12 is a block diagram representing the sound system of a motion picture theater. As is conventional, the motion picture theater includes a motion picture projector 160 with a sound head housing 162. The projector 160 operates conventionally to receive motion picture film (not shown) with an analog audio sound track and a sequence of visual images. The projector 160 advances the motion picture film and includes conventional optical means to project at 161 the sequence of images onto a screen 164. As a motion picture film is advanced through the projector 160, it travels through the sound head housing 162. The sound head housing 162 includes a scanning photo detector 165 of the invention, which scans the sound track on the motion picture film in the manner described above. Assuming that the motion picture film has a stereophonic sound track with channels A and B, the scanning analog-digitizer outputs streams of width-modulated pulses at A and B which are fed to an analog converter 166 corresponding essentially to the apparatus illustrated in FIG. 7. The analog converter 166 may be located within the projector 160 or externally to it, as illustrated in FIG. 12. The converter 166 converts the width-modulated pulses in channels A and B to audio signals denoted as audio A and audio B in FIG. 12 which are fed respectively, to amplifiers 168A and 168B. The channel A and B audio signals are processed conventionally by a preamplifier equalization circuit 170 amplified by power amplifier 171, and fed to theater speakers 172A and 172B which provide sound accompaniment to the visual presentation on the screen 164.

Clearly, other embodiments and modifications of the present invention will occur readily to those of ordinary skill in the art in view of these teachings. Therefore, this invention is to be limited only by the following claims, which include all such embodiments and modifications.

What is claimed is:

1. An apparatus for converting a motion picture analog sound track having a variable width and defining left and right boundaries into corresponding electrical signals, comprising:

a sound head housing having an entrance opening for the motion picture sound track to enter therein, said sound head housing also having an exit opening for the motion picture sound track to travel through;

a source of light for generating light toward the sound track as the sound track passes through the sound head housing;

means for scanning the instantaneous width of the sound track through which light from the light source has been projected and generating at least a first scan of the sound track and a second scan of the sound track, the second scan being temporally subsequent to the first scan;

a processing circuit electrically connected to the scanning means for receiving the first and second scans and generating from the first scan a first left boundary signal representative of the left boundary of the sound track and a first right boundary signal representative of the right boundary of the sound track, the processing circuit also generating, from the second scan, a second left boundary signal representative of the left boundary of the sound track and a second right boundary signal representative of the right boundary of the sound track, the processing circuit combining all four boundary signals and generating an output signals representative thereof, such that any noise characteristics that are unique to only a single one of the boundary signals are reduced by a factor of about four in the output signal.

* * * * *